(12) United States Patent
Fukuda

(10) Patent No.: US 8,356,269 B2
(45) Date of Patent: Jan. 15, 2013

(54) DUMMY-METAL-LAYOUT EVALUATING DEVICE AND DUMMY-METAL-LAYOUT EVALUATING METHOD

(75) Inventor: Daisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/112,192

(22) Filed: May 20, 2011

(65) Prior Publication Data

US 2012/0047472 A1 Feb. 23, 2012

(30) Foreign Application Priority Data

Aug. 19, 2010 (JP) ................................ 2010-184403

(51) Int. Cl.
*G06F 17/50* (2006.01)
(52) U.S. Cl. ...................................................... 716/132
(58) Field of Classification Search .................. 716/100, 716/132

See application file for complete search history.

(56) References Cited

U.S. PATENT DOCUMENTS

| | | | |
|---|---|---|---|
| 6,093,631 A | 7/2000 | Jaso et al. | |
| 6,841,880 B2 * | 1/2005 | Matsumoto et al. | 257/773 |
| 6,892,363 B2 * | 5/2005 | Li | 716/112 |
| 7,269,807 B2 | 9/2007 | Shimada et al. | |
| 7,271,490 B2 * | 9/2007 | Mori et al. | 257/773 |
| 7,332,380 B2 | 2/2008 | Matsuda | |
| 7,743,356 B2 * | 6/2010 | Yomogita | 716/122 |
| 2003/0204832 A1 * | 10/2003 | Matumoto | 716/19 |
| 2004/0145028 A1 * | 7/2004 | Matsumoto et al. | 257/620 |
| 2005/0073052 A1 * | 4/2005 | Mori et al. | 257/758 |
| 2008/0237870 A1 * | 10/2008 | Nakao et al. | 257/758 |
| 2010/0270686 A1 * | 10/2010 | Nakao et al. | 257/774 |

FOREIGN PATENT DOCUMENTS

| | | |
|---|---|---|
| JP | 9-115905 A | 5/1997 |
| JP | 11-265866 A | 9/1999 |
| JP | 2000-340568 A | 12/2000 |
| JP | 2005-222214 A | 8/2005 |
| JP | 2006-060051 A | 3/2006 |
| JP | 2007-011729 A | 1/2007 |

\* cited by examiner

*Primary Examiner* — Suchin Parihar
(74) *Attorney, Agent, or Firm* — Fujitsu Patent Center

(57) ABSTRACT

A dummy-mesh-information creating unit separates a group of dummy metal blocks that are arranged in a pattern regularly staggered with respect to a direction of a wire object into meshes so that each mesh has the same layout of dummy metal blocks. An overlap determining unit determines whether a dummy metal block within a dummy mesh overlaps with the wire object. A dummy-information calculating unit calculates dummy information after any dummy metal block that is determined to be overlapped with the wire object is removed. An information integrating unit integrates the dummy information with information about the wire object, thereby generating a dummy-fill circuit layout. An evaluating unit evaluates whether the dummy-fill circuit layout satisfies the design criteria.

6 Claims, 20 Drawing Sheets

(1)

(2)

(3)

DUMMY-METAL-LAYOUT EVALUATING DEVICE AND DUMMY-METAL-LAYOUT EVALUATING METHOD

CROSS-REFERENCE TO RELATED APPLICATION

This application is based upon and claims the benefit of priority of the prior Japanese Patent Application No. 2010-184403, filed on Aug. 19, 2010, the entire contents of which are incorporated herein by reference.

FIELD

The embodiments discussed herein are directed to a dummy-metal-layout evaluating device and a dummy-metal-layout evaluating method.

BACKGROUND

During a process for producing a semiconductor integrated circuit, a wafer is exposed to light, then etched, then coated (plated), and then polished. This process is repeated until a layered structure is built up, and thus a desired circuit is produced. For high productivity during the process, two or more semiconductor integrated circuits are formed on one wafer at the same time.

One recent demand is to increase the number of circuits fabricated at the same time by increasing the diameter of the wafers. However, as the area of a wafer increases, it becomes more difficult to process a central section and a peripheral section of the wafer uniformly. Moreover, as smaller circuits are developed, highly accurate processing is required.

For example, with copper wiring, which is the recent mainstay of the field, a trench for wiring is formed on an insulator and then the insulator is plated with copper so that the trench is filled with copper. This plating method is called electro-chemical plating (ECP). Because not only the trench but also the entire insulator is plated with copper, the wafer is then polished using chemical mechanical polishing (CMP) so as to reveal the wiring pattern.

If large differences in height are formed on a wafer after CMP, things such as variations in the height of copper wires and excess copper cause short circuits. This decreases the performance and the yield rate.

The CMP removal rate is different depending on the material. For example, the removal rate of a copper wire is higher than the removal rate of an insulating layer. To suppress variations in height after CMP, it is important to maintain a uniform wire density. The wire density is the percentage area of a chip taken up by wiring. The wire density is also called "metal density" because wires are made of metal. Variations in height after CMP are also affected by the peripheral length of the wire.

Dummy metal fill for filling dummy metal (dummy wire) is a well-known technology for maintaining a uniform wire density and a uniform peripheral wire length. An area having a low wire density is filled with dummy metal in such a manner that the dummy metal is electrically disconnected from the real wire. Dummy metal cannot work as an electrical wire; therefore, dummy metal makes it possible to adjust the wire density and the peripheral wire length so that the CMP removal amount is adjusted to an appropriate value without affecting the operation of a circuit made up of real wires.

As smaller circuit layouts are developed, the amount of dummy metal data is increased and, therefore, filling with dummy metal in a regular pattern is required. Moreover, to suppress variation in the volume component of layered wire, it is preferable to arrange dummy metal in a pattern staggered with respect to the direction in which a wire object extends (in a zigzag pattern). A wire object, herein, is a metal area that is connected to another wire object and works as a part of an electric circuit. For example, a wire object having a narrow width works as a resistor and a pair of wire objects with an insulator between them works as a capacitor. A wire object is designed to have a given position specified by reference directions or XY directions. A reference direction for a wire object layout is the direction in which a wire object extends.

A dedicated dummy-metal-fill tool makes it possible to arrange dummy metal in a pattern staggered with respect to the direction in which a wire object extends. After the dummy metal is filled, it is checked whether the wire density and the peripheral wire length satisfy the circuit design criteria using a different tool. Therefore, a loop of dummy fill and layout checking is created, which increases the time taken to set a proper dummy layout.

Patent Document 1: Japanese Laid-open Patent Publication No. 11-265866

Patent Document 2: Japanese Laid-open Patent Publication No. 2006-060051

Patent Document 3: Japanese Laid-open Patent Publication No. 2000-340568

Patent Document 4: Japanese Laid-open Patent Publication No. 09-115905

Patent Document 5: Japanese Laid-open Patent Publication No. 2005-222214

Patent Document 6: Japanese Laid-open Patent Publication No. 2007-011729

SUMMARY

According to an aspect of an embodiment of the invention, a dummy-metal-layout evaluating device includes a genetion unit that separates a group of dummy metal blocks that are arranged in a pattern regularly staggered with respect to a direction in which a wire object extends into meshes so that each mesh has the same layout of dummy metal blocks, thereby generating dummy meshes; a determination unit that determines whether a dummy metal block within the generated dummy mesh overlaps with the wire object; a calculation unit that calculates dummy information after any dummy metal block that is determined to be overlapped with the wire object is removed; and an evaluation unit that evaluates whether a dummy-fill circuit layout satisfies a design criterion, the dummy-fill circuit layout being generated by integrating the dummy information with information about the wire object.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The technology of the present invention is not limited to the following embodiments.

[a] First Embodiment

Figure 1:
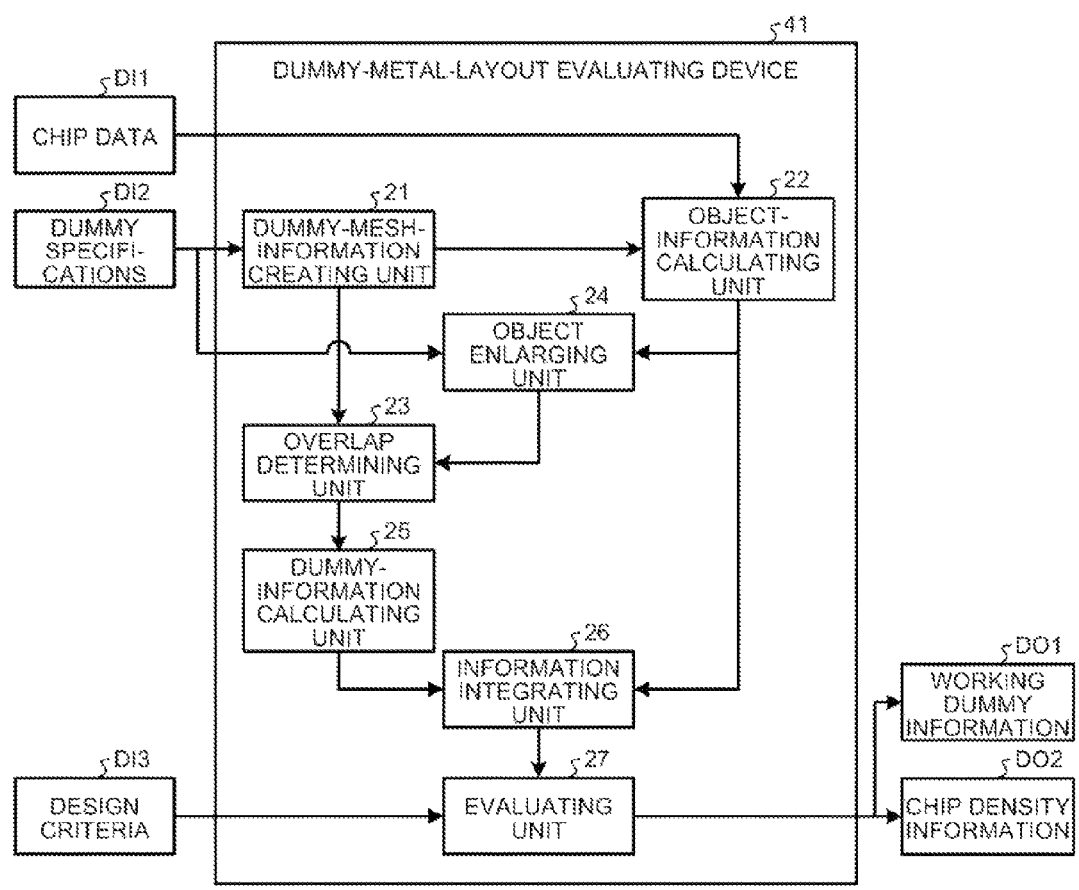
FIG. 1 is a block diagram of a dummy-metal-layout evaluating device according to the first embodiment.

FIG. 1 is a block diagram of a dummy-metal-layout evaluating device according to the present embodiment. As illustrated in FIG. 1, a dummy-metal-layout evaluating device 41 receives chip data DI1, dummy specifications DI2, and design criteria DI3 and then outputs working dummy information DO1 and chip density information DO2.

The dummy-metal-layout evaluating device 41 includes a dummy-mesh-information creating unit 21, an object-information calculating unit 22, an overlap determining unit 23, an object enlarging unit 24, a dummy-information calculating unit 25, an information integrating unit 26, and an evaluating unit 27.

The dummy-mesh-information creating unit 21 is a dummy-mesh generating unit that separates a group of dummy metal blocks into meshes, thereby generating dummy meshes. The dummy metal blocks are arranged in a pattern regularly staggered with respect to the direction in which a wire object extends. The dummy-mesh-information creating unit 21 generates dummy meshes such that each mesh has the same dummy metal layout. The layout of dummy metal blocks is acquired from the dummy specifications DI2.

The object-information calculating unit 22 calculates the wire density and the peripheral wire length of the wire objects within each dummy mesh. The layout of wire objects is acquired from the chip data DI1.

The object enlarging unit 24 increases the width of a wire object in accordance with a rule that defines the space between a wire object and a piece of dummy metal. The overlap determining unit 23 determines whether a dummy metal block that is in the mesh overlaps with the wire object enlarged by the object enlarging unit 24.

The dummy-information calculating unit 25 removes dummy metal blocks that are determined by the overlap determining unit 23 to be blocks overlapping the wire object and calculates dummy information.

The information integrating unit 26 integrates information about the wire object within the mesh with the dummy information and calculates the wire density and the peripheral wire length of a circuit layout filled with dummy. The evaluating unit 27 evaluates whether the wire density and the peripheral wire length of the circuit layout filled with dummy satisfy the design criteria DI3.

If the evaluating unit 27 evaluates that the wire density and the peripheral wire length of the circuit layout filled with dummy satisfy the design criteria DI3, the evaluating unit 27 outputs the currently used dummy information as the working dummy information DO1. Moreover, the evaluating unit 27 outputs the wire density and the peripheral wire length of the circuit layout filled with dummy as the chip density information DO2. If the wire density and the peripheral wire length of the circuit layout filled with dummy do not satisfy the design criteria DI3, the dummy-metal-layout evaluating device 41 reads a different dummy metal layout from the dummy specifications DI2 and performs the above process with the different dummy metal layout.

Figure 2:
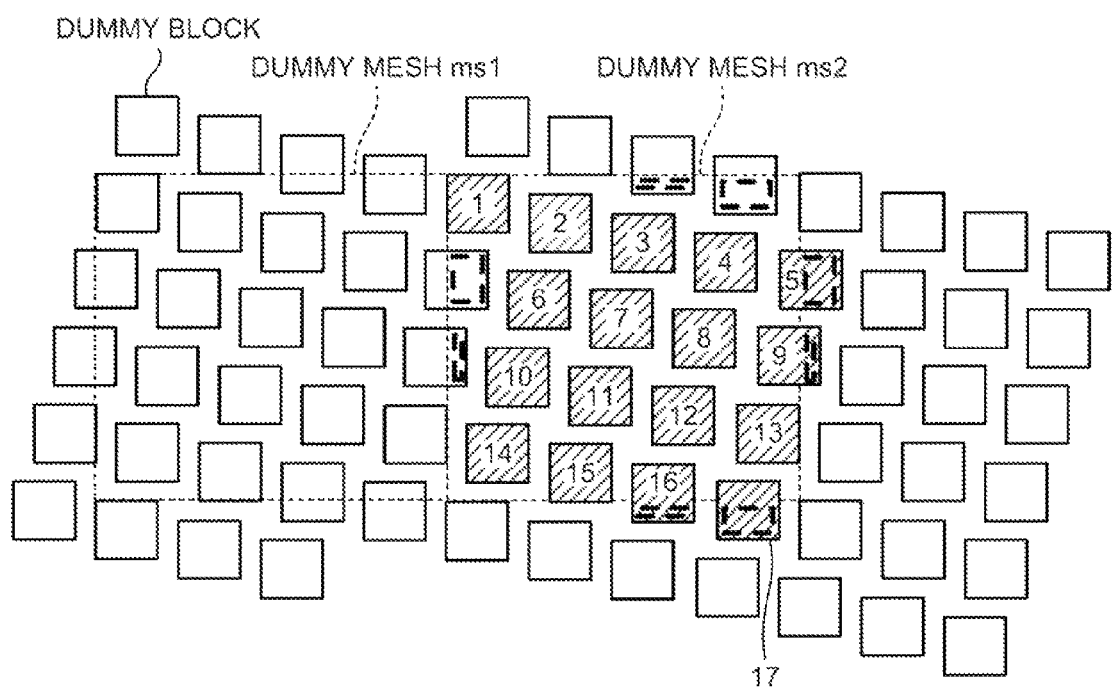
FIG. 2 is a schematic diagram of dummy meshes.

FIG. 2 is a schematic diagram of dummy meshes. The dummy meshes illustrated in FIG. 2 include dummy meshes ms1 and ms2, each having an amount of dummy metal equivalent to 17 blocks of dummy metal. The upper left corner of the dummy mesh ms2 is aligned with the upper left corner of the block 1. The blocks 2 to 5 are aligned to the right of the block 1 and each subsequent block is shifted in a downwards direction by the same amount relative to the block on its left. The right part of the block 5 protrudes out from the dummy mesh ms2.

The blocks 6 to 9 are at positions to the lower left of the blocks 2 to 5, respectively. Similarly, the blocks 10 to 13 are at positions to the lower left of the blocks 6 to 9, respectively. Similarly, the blocks 14 to 17 are at positions to the lower left of the blocks 10 to 13, respectively. The right part of the block 9 protrudes out from the dummy mesh ms2. The lower parts of the blocks 16 and 17 protrude out from the dummy mesh ms2.

Although the blocks 5, 9, 16, and 17 partially protrude out from the dummy mesh ms2, because identical parts protrude from an adjacent mesh at the opposite side into the dummy mesh ms2, the amount of dummy metal within the mesh is equivalent to 17 blocks of dummy metal. Each mesh has the same block layout.

Figure 3:
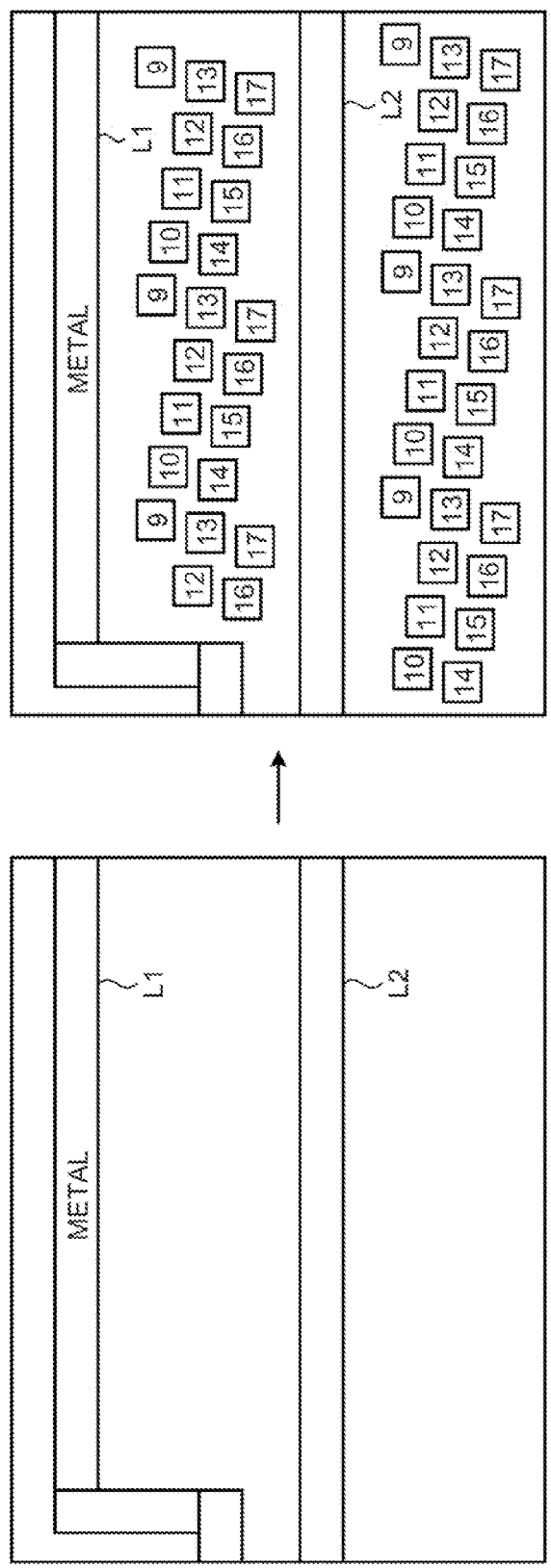
FIG. 3 is a schematic diagram of the layout of wire objects and dummy blocks.

FIG. 3 is a schematic diagram of the layout of wire objects and dummy metal blocks. The dummy-metal-layout evaluating device overlaps the dummy meshes illustrated in FIG. 2 with wire objects L1 and L2 and arranges blocks that do not overlap with the wire objects L1 and L2. Any block even partially overlapping with the wire object L1 or L2 is not arranged. With the above way of removing only blocks that are overlapped with wire from each dummy mesh having the same block layout, by setting blocks to be removed from each dummy mesh, it can set one dummy layout, while decreasing the amount of dummy layout data.

Figure 4A:
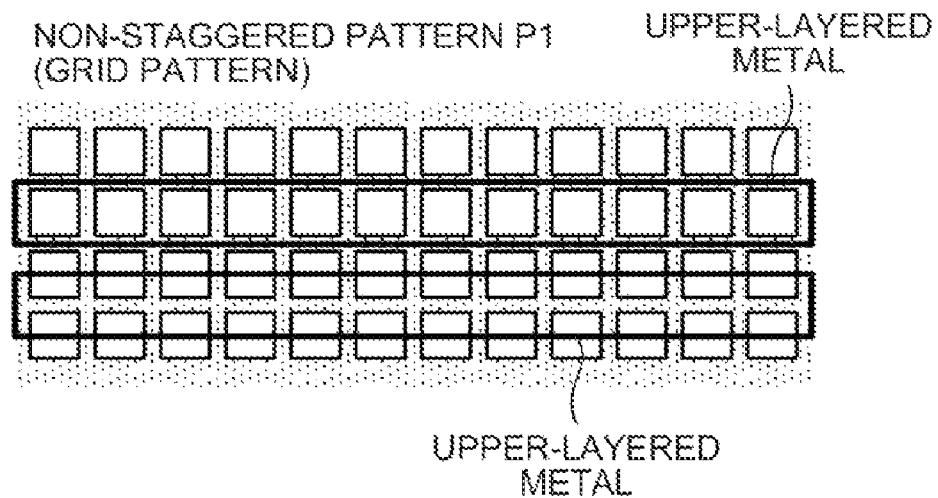
FIG. 4A is a schematic diagram of a pattern of the layout of dummy metal blocks.

FIG. 4A is a schematic diagram of a pattern of the layout of dummy metal blocks. In a grid pattern P1, where dummy metal is in a pattern aligned with (non-staggered with respect to) the direction in which a wire object extends, the variation in area overlapping with upper-layered metal wires is large. As the area overlapping with the upper-layered metal wires increases, the wire volume component increases. As the area overlapping with the upper-layered metal wires decreases, the wire volume component of wire decreases. As the variation in wire volume increases, the tolerance limit increases.

Figure 4B:
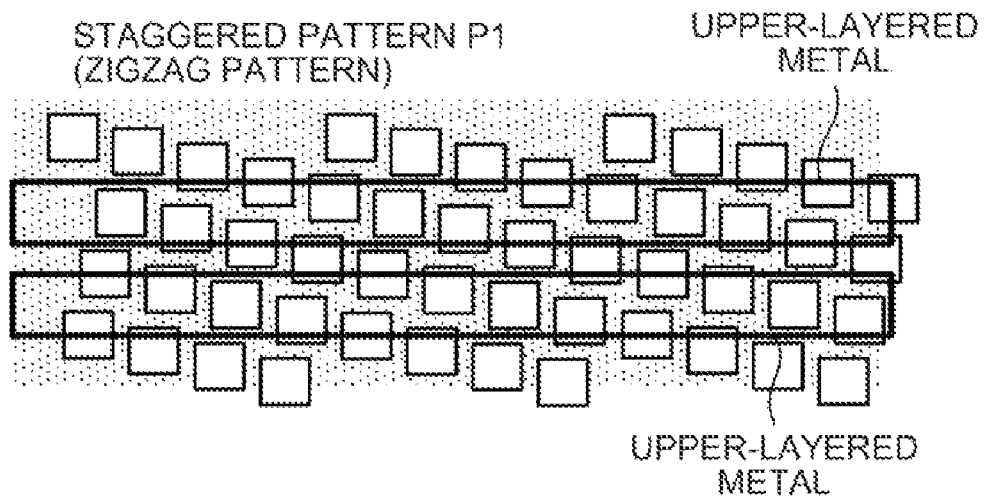
FIG. 4B is a schematic diagram of another pattern of the layout of dummy metal blocks.

FIG. 4B is a schematic diagram of another pattern of the layout of dummy metal blocks. As illustrated in FIG. 4b, a staggered pattern P2 (zigzag pattern), where dummy metal is in a pattern staggered with respect to the direction in which a wire object extends, the variation in area overlapping with upper-layered metal wires is small. This pattern can suppress the variation in wire volume and improves the yield rate.

Figure 5:
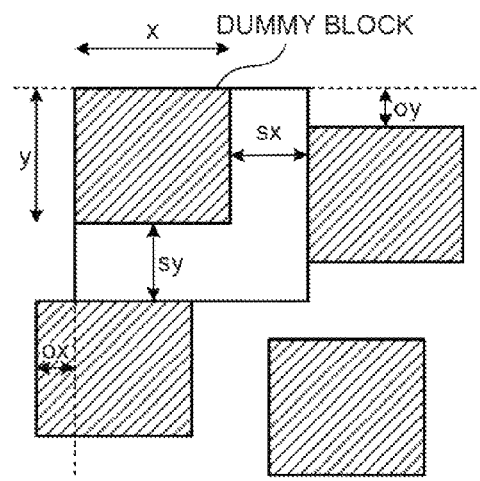
FIG. 5 is a schematic diagram that illustrates how dummy meshes are generated.

FIG. 5 is a schematic diagram that illustrates how dummy meshes are generated. If a block of dummy metal has a width x, a height y, an interval between blocks in the x direction sx, an interval between blocks in the y direction sy, an offset between blocks in the x direction ox, an offset between blocks in the y direction oy, then a mesh size (x) or the width of the dummy mesh (length in the x direction) and a mesh size (y) or the height of a dummy mesh (length in the y direction) are calculated as follows:

$$\text{mesh size (x): } (x+sx)*(y+sy)/oy*\alpha+ox$$

$$\text{mesh size (y): } (y+sy)*(x+sx)/ox*\beta+oy$$

where $\alpha$ is a constant to set $(y+sy)/oy$ to be an integer and $\beta$ is a constant to set $(x+sx)/ox$ to be an integer. Because $\alpha$ and $\beta$ are calculated as specified above, the layout of dummy blocks in each mesh is identical.

For example, if x=y=0.7, sx=sy=0.3, and ox=oy=0.2, then mesh size=(0.7+0.3)*(0.7+0.3)/0.2 *1+0.2=5.2; and if x=y=0.6, sx=sy=0.2, and ox=oy=0.3, then mesh size=(0.6+0.2)*(0.6+0.2)/0.3 *3+0.3=6.7.

Figure 6:
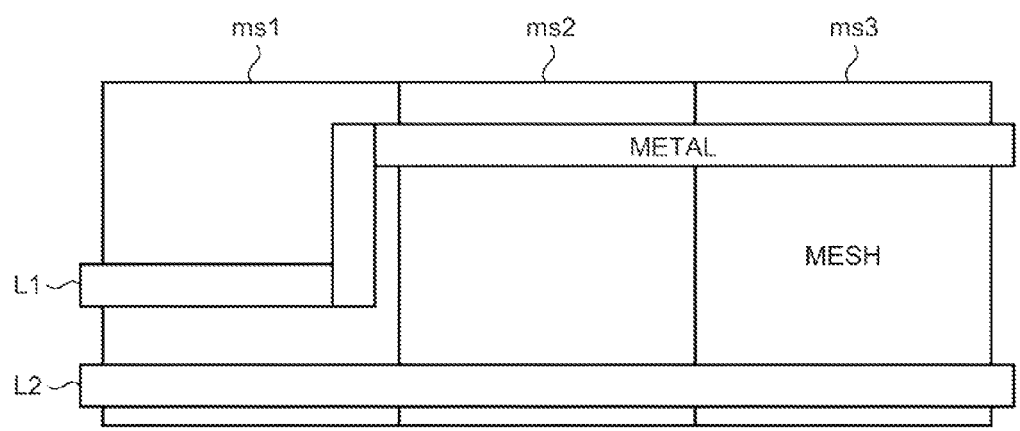
FIG. 6 is a schematic diagram that illustrates how object information is calculated.

FIG. 6 is a schematic diagram that illustrates how object information is calculated. The object-information calculating unit 22 acquires positional information about a dummy mesh from the dummy-mesh-information creating unit 21 and the layout of a wire object from the chip data DI1. The object-information calculating unit 22 extracts wire objects overlapping with each dummy mesh and calculates the wire density and the wire peripheral length of the wire objects within each dummy mesh as object information. In the example illustrated in FIG. 6, the wire objects L1 and L2 overlap with the dummy meshes ms1 to ms3.

Figure 7:
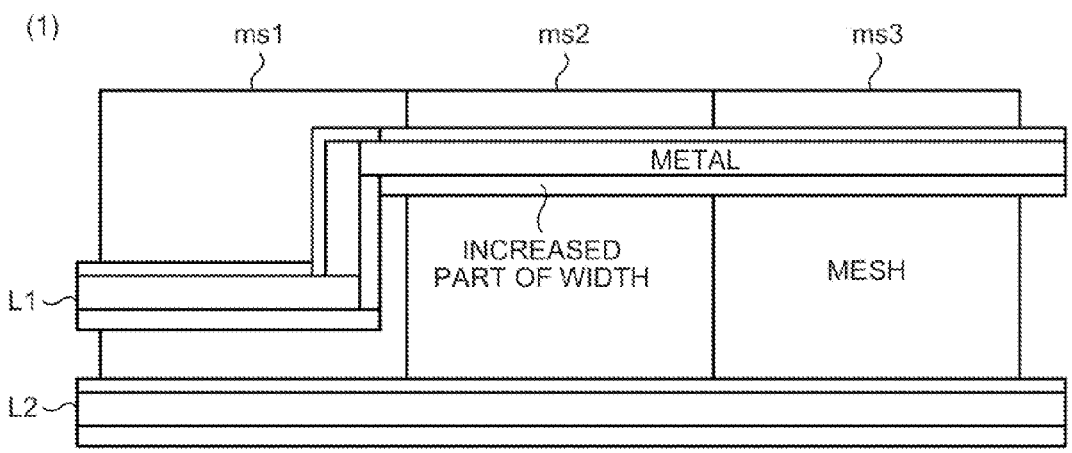
FIG. 7 is a schematic diagram that illustrates how a wire object and a block are enlarged.
Figure 7:
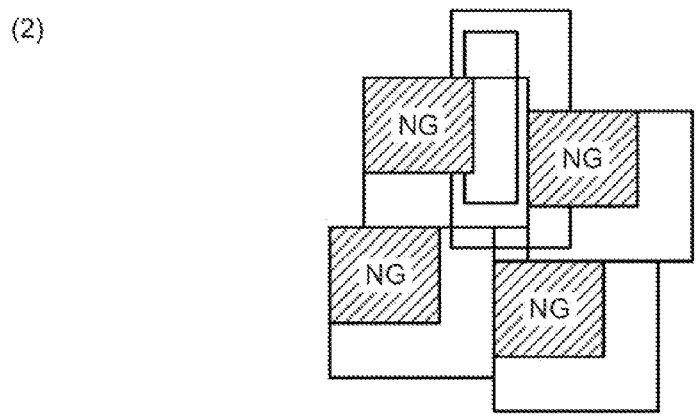
Figure 7:
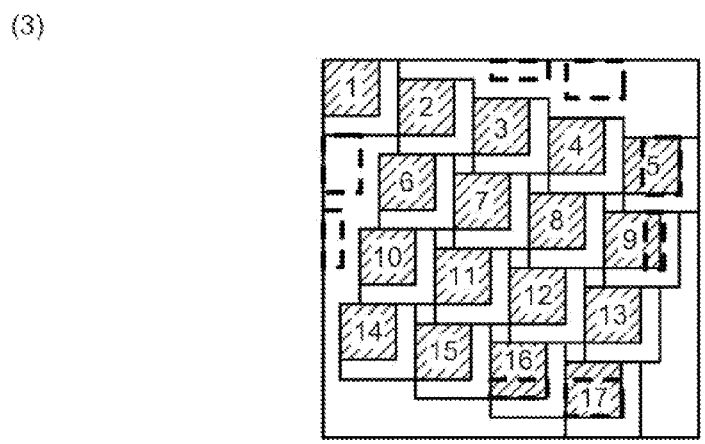

FIG. 7 is a schematic diagram that illustrates how a wire object and a block are enlarged. A spacing rule defines the space between a block of dummy metal and a wire object. Blocks of dummy metal are arranged based on the spacing rule. As illustrated in (1) of FIG. 7, the object enlarging unit 24 enlarges the wire object or increases the width of the wire object downward and rightward by an amount specified by the spacing rule, while it enlarges the wire object or increases the width of the wire object leftward and upward by an amount equal to a difference between the amount specified by the spacing rule and the offset between dummy blocks.

The overlap determining unit 23 determines whether a block that is in the dummy mesh overlaps with the wire object enlarged by the object enlarging unit 24. As illustrated in (2) of FIG. 7, the overlap determining unit 23 determines a block overlapping with the enlarged wire object to be invalid and then removes the block, while it determines a block that does not overlap with the enlarged wire object to be valid and leaves the block undeleted. During the determining, each block is enlarged or the width of each block is increased rightward and downward by an amount equivalent to the offset. The section (3) of FIG. 7 is a schematic diagram that illustrates how dummy blocks are enlarged. The enlarged block can protrude out into another dummy mesh and overlap with the dummy mesh. The areas surrounded by the broken lines in (3) of FIG. 7 are determined to be valid or invalid during determining with adjacent meshes.

Figure 8:
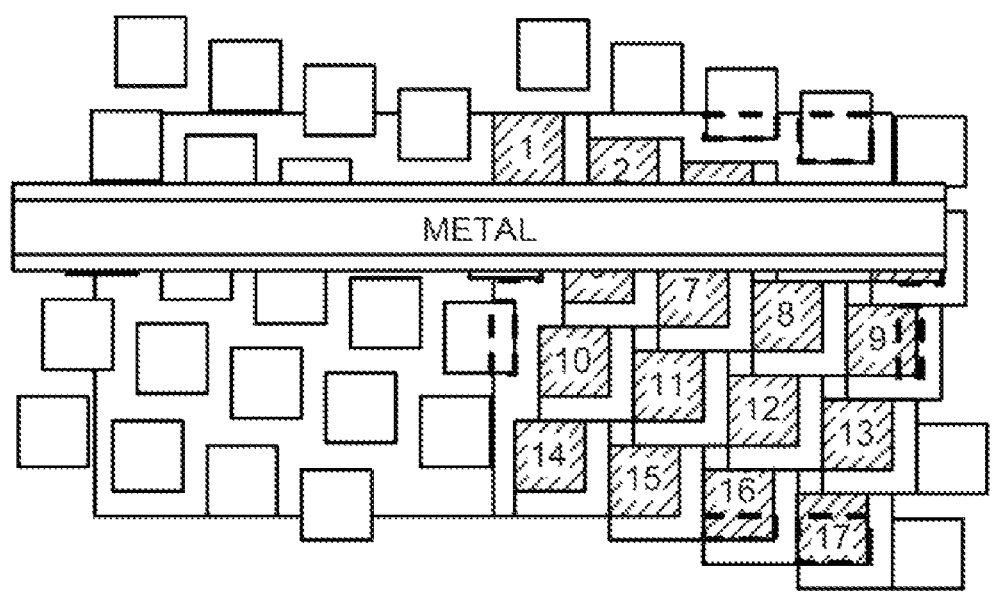
FIG. 8 is a schematic diagram that illustrates how overlap determining is simplified.

A general graphic computing technology is useful for the determining whether a dummy block overlaps with a wire object. Because, as described above, each dummy mesh has the same block layout, it is possible to use a simplified overlap determining. For example, as illustrated in FIG. 8, the overlapping part of the right dummy mesh is identical to the overlapping part of the left dummy mesh.

The overlap determining unit 23 records a result of the overlap determining, i.e., the status of valid or invalid assigned to each block within the dummy mesh. As for blocks on the peripherals of the dummy mesh, it refers to the adjacent dummy meshes.

The dummy-information calculating unit 25 calculates, using the valid blocks within each dummy mesh, the wire density and the peripheral wire length of the dummy mesh. The object-information calculating unit 22 calculates, using the not-enlarged wire object within each dummy mesh, the wire density and the peripheral wire length of the dummy mesh.

The information integrating unit 26 adds the wire density of dummy calculated by the dummy-information calculating unit 25 and the wire density of wire objects calculated by the object-information calculating unit 22, thereby calculating the density of the total wire within each dummy metal. Similarly, the information integrating unit 26 adds the peripheral wire length of dummy calculated by the dummy-information calculating unit 25 and the peripheral wire length of wire objects calculated by the object-information calculating unit 22, thereby calculating the peripheral length of the total wire within each dummy metal.

The evaluating unit 27 determines whether the density of the total wire and the peripheral length of the total wire both calculated by the information integrating unit 26 satisfy the design criteria DI3. The design criteria DI3 define upper and lower limits and allowable variation of the wire density and the peripheral wire length.

Figure 9:
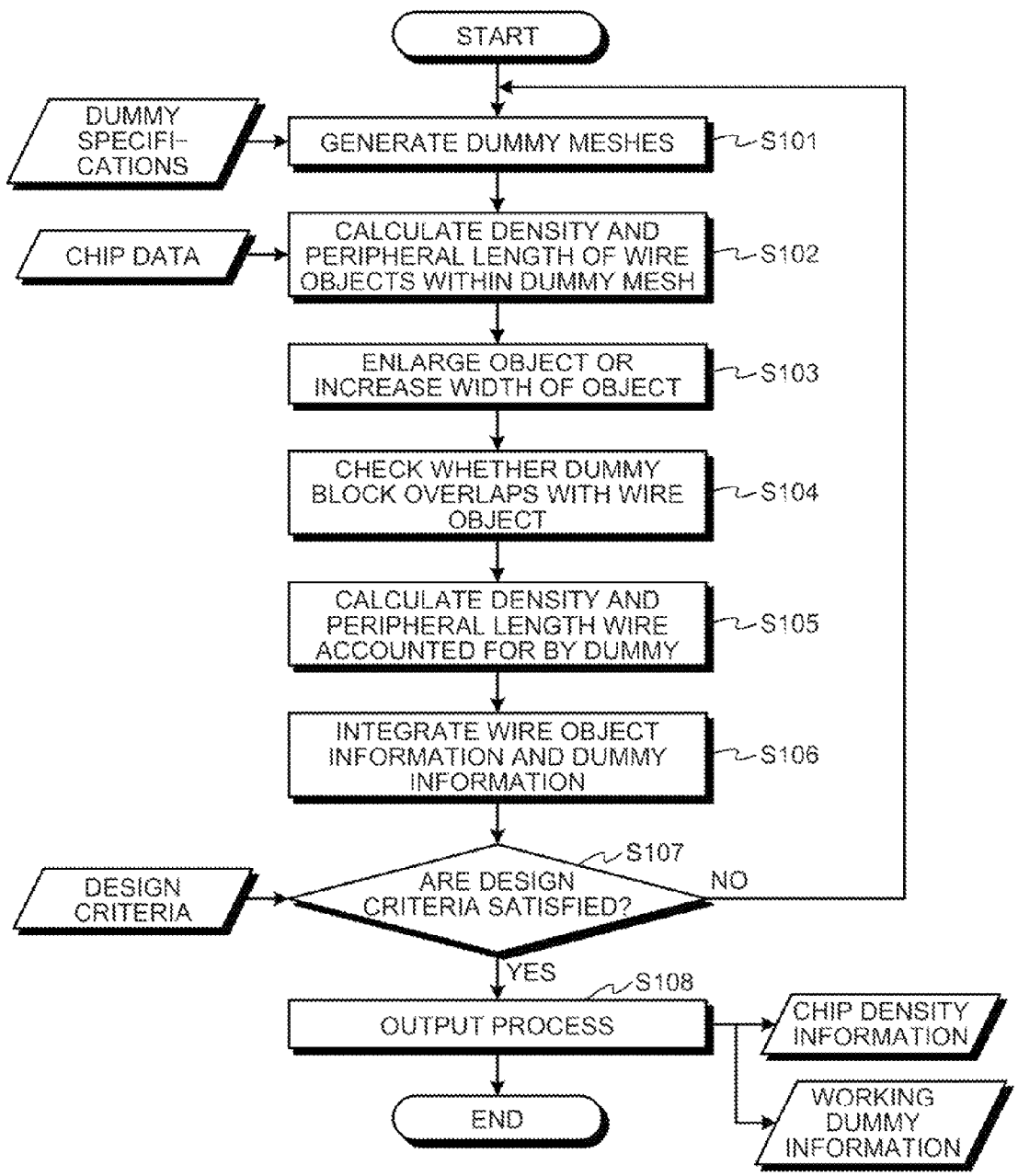
FIG. 9 is a flowchart of a process performed by the dummy-metal-layout evaluating device.

FIG. 9 is a flowchart of a process performed by the dummy-metal-layout evaluating device. When the process starts, the dummy-mesh-information creating unit 21 generates dummy meshes based on the dummy specifications DI2 (S101). The object-information calculating unit 22 calculates, using dummy-mesh positional information and the chip data DI1, the wire density and the peripheral wire length of the wire objects within the dummy mesh (S102). The object enlarging unit 24 enlarges the wire object or increases the width of the wire object based on the dummy rule and the spacing rule both specified by the dummy specifications DI2 (S103).

The overlap determining unit 23 checks whether a dummy block overlaps with the enlarged wire object (S104). The dummy-information calculating unit 25 calculates, using blocks that do not overlap with the enlarged wire object, the density and the peripheral length of wire accounted for by dummy (S105). The information integrating unit 26 integrates information about the wire object and information about the dummy (S106). The evaluating unit 27 evaluates whether the integrated information satisfies the design criteria DI3 (S107). If it does not satisfy the design criteria DI3 (S107, No), the process control returns to Step S101 and the dummy-metal-layout evaluating device 41 selects a different dummy rule and then generates dummy meshes.

If it satisfies the design criteria DI3 (S107, Yes), the evaluating unit 27 outputs the currently used dummy information as the working dummy information DO1 and the chip density information DO2 (S108), and thus the process control goes to end.

Figure 10:
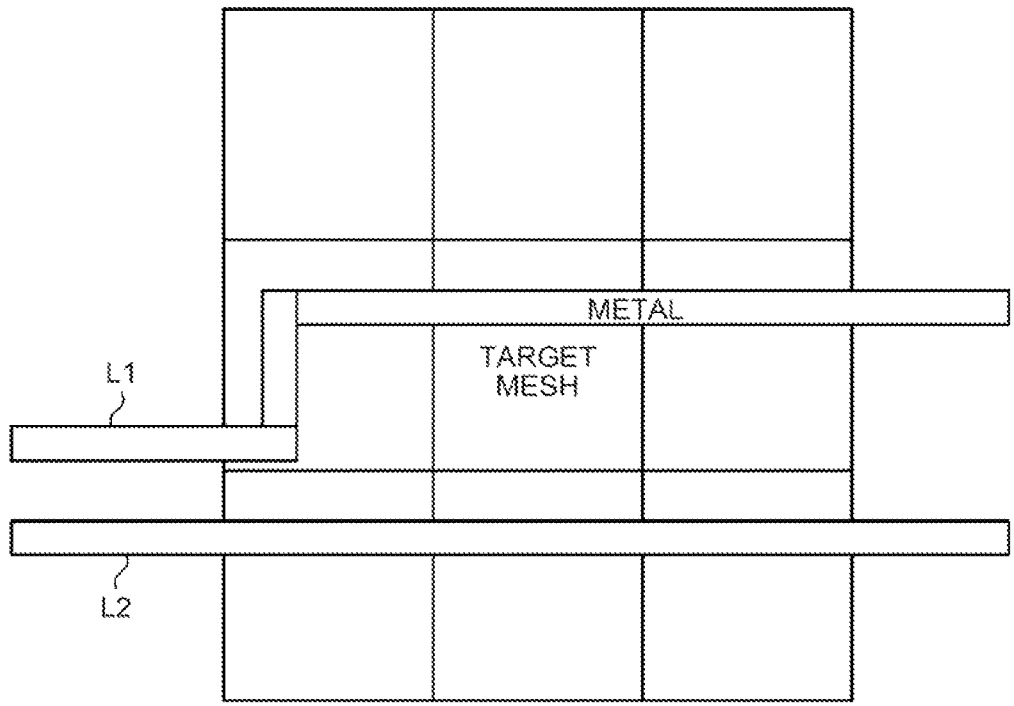
FIG. 10 is a first schematic diagram of an example of the operation of the dummy-metal-layout evaluating device 41.

The operation of the dummy-metal-layout evaluating device 41 is described below with examples. In FIG. 10, a central mesh is set to be a target mesh. The size of each dummy mesh is 6.3×6.3 μm. The values of x and y of dummy blocks are 1.2 μm. The dummy spaces sx and sy are 0.3 μm. The offsets ox and oy are 0.375 μm.

The dummy mesh is identified by [layer], [x], and [y], where [layer] indicates the layer number and [x] and [y] indicate the position of the mesh on the layer. Each dummy mesh has x, y, Dens, Dens1, and Dens2 as item data, where Dens is a percentage (%) of total copper in the dummy mesh, Desn1 is a percentage of copper accounted for by the wire object section, and Dens2 is a percentage of copper accounted for by the dummy section. Similarly, each dummy mesh has Edge length, Edge length1, Edge length2, and block as item data, where Edge length is a peripheral length (μm) of total wire within the dummy mesh, Edge length1 is a peripheral length of wire accounted for by the wire object section, Edge length2 is a peripheral length of wire accounted for by the dummy section, and block indicates whether the dummy block is valid or invalid.

In the example illustrates in FIG. 10, because the wire objects L1 and L2 are arranged but dummy is not arranged, no information is registered about dummy. Registered information is as follows:

| | |
|---|---|
| Dens | 12.7% |
| Dens1 | 12.7% |
| Dens2 | 0% |
| Edge length | 12.6 μm |
| Edge length1 | 12.6 μm |
| Edge length2 | 0 μm |
| block | (unregistered) |

Figure 11:
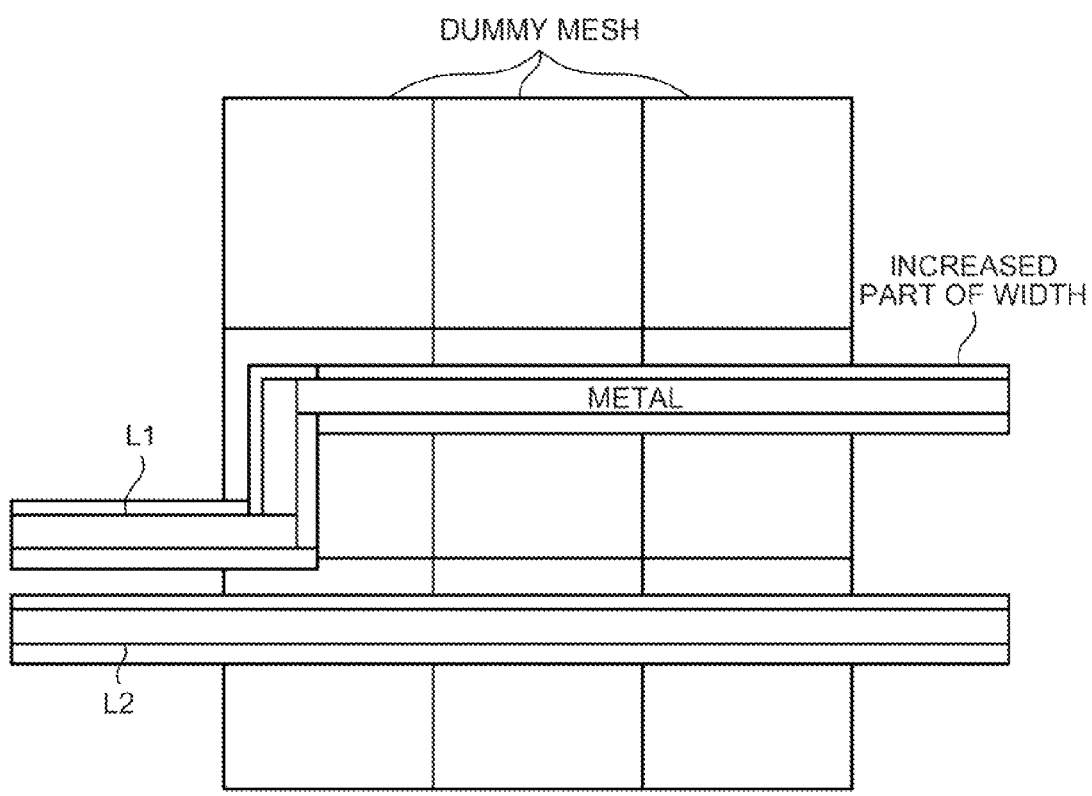
FIG. 11 is a second schematic diagram of an example of the operation of the dummy-metal-layout evaluating device 41.
Figure 12:
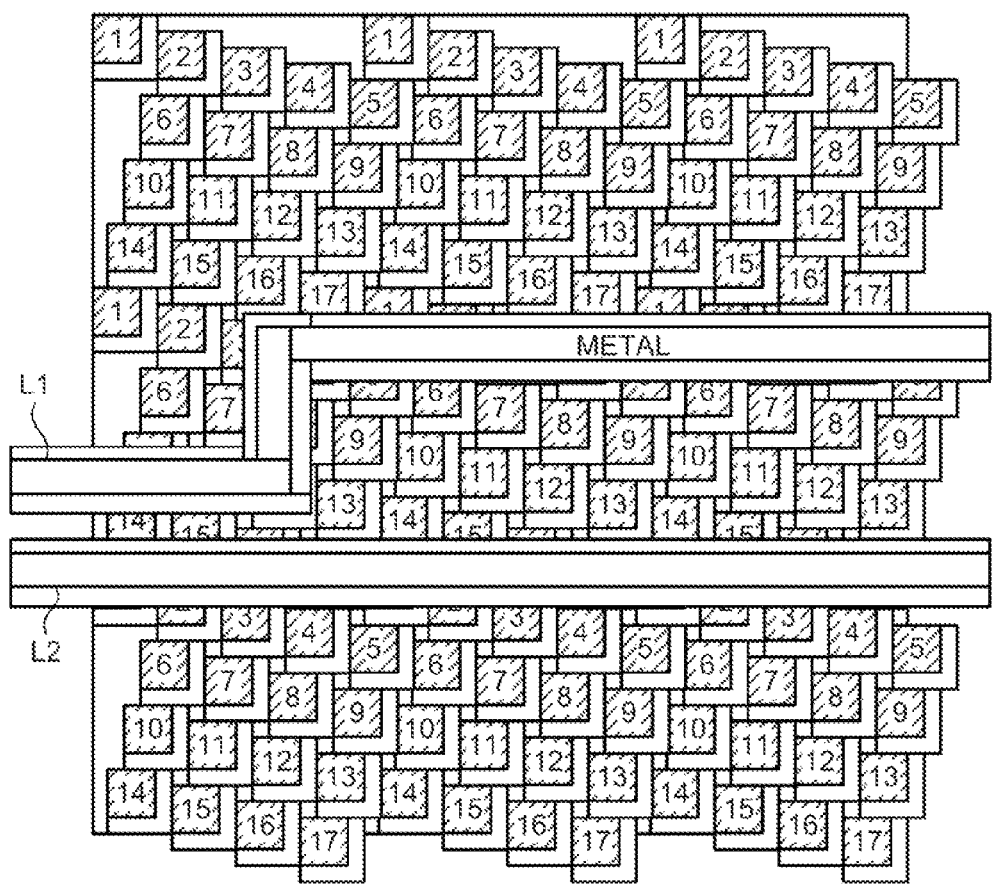
FIG. 12 is a third schematic diagram of an example of the operation of the dummy-metal-layout evaluating device 41.
Figure 13:
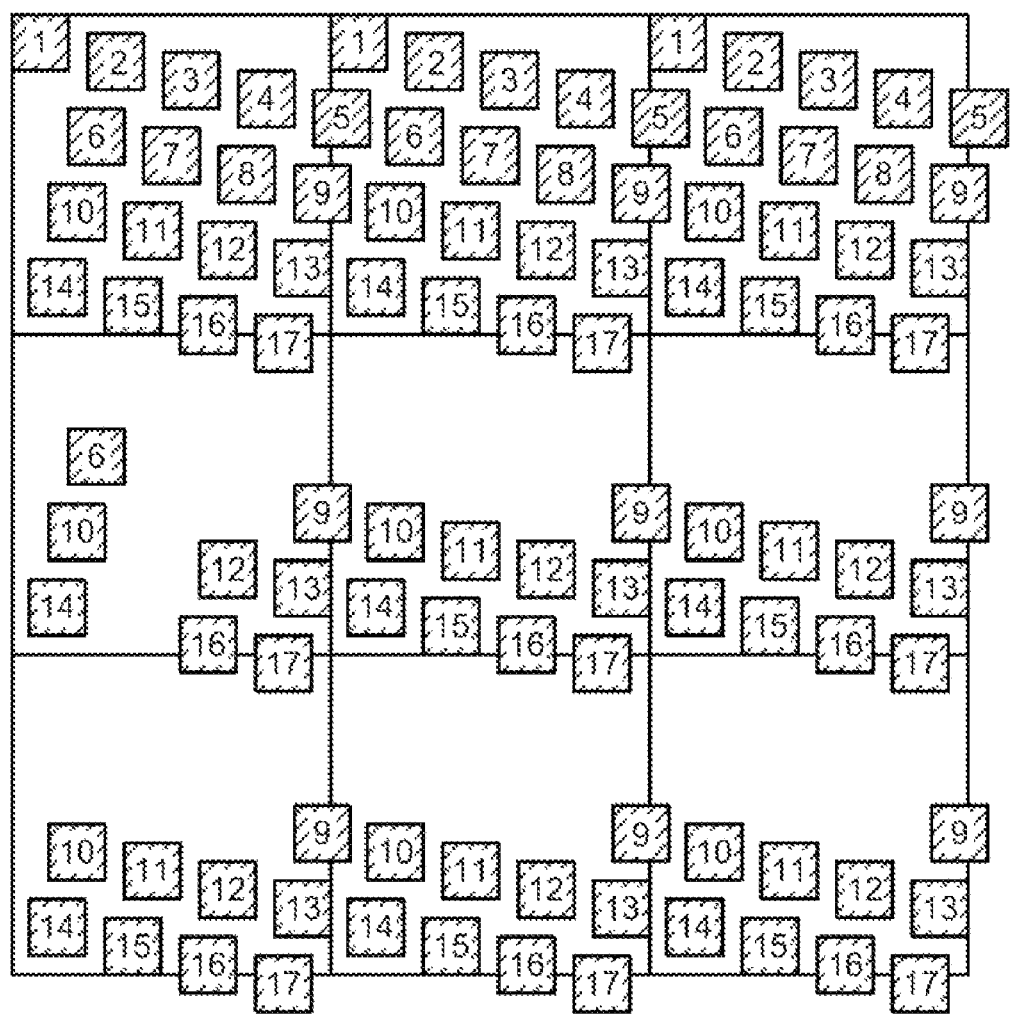
FIG. 13 is a fourth schematic diagram of an example of the operation of the dummy-metal-layout evaluating device 41.

The widths of the wire objects L1 and L2 are increased from the widths as illustrated in FIG. 10 to the widths as illustrated in FIG. 11 and only blocks that do not overlap with the increased-width wire objects are left undeleted. FIG. 12 is a schematic diagram of the wire objects and the blocks; FIG. 13 is a schematic diagram of the blocks only. In the target dummy mesh, blocks from the ninth block 9 to the seventeenth block 17 are arranged, while blocks from the first block 1 to the eighth block 8 are not arranged. The arranged blocks are determined to be valid and have the item "block" of 1. The non-arranged (removed) blocks are determined to be invalid and have the item "block" of 0.

The percentage of copper accounted for by dummy is calculated to be (1.2×1.2)×9 (blocks)/(6.3×6.3)=32.65%; the peripheral length of wire accounted for by dummy is calculated to be (1.2×4)×9 (blocks)=43.2.

The dummy-block information is added to the dummy-mesh information. The thus created dummy-mesh information is as follows:

| | |
|---|---|
| Dens | 45.35% |
| Dens1 | 12.7% |
| Dens2 | 32.65% |
| Edge length | 55.8 μm |
| Edge length1 | 12.6 μm |
| Edge length2 | 43.2 μm |
| block | 00000000111111111 |

As described above, the dummy-metal-layout evaluating device 41 used in the present embodiment separates a group of dummy metal blocks that is arranged in a pattern regularly staggered with respect to the direction in which a wire object extends into meshes so that each mesh has the same dummy metal layout. The dummy-metal-layout evaluating device 41 determines whether a dummy metal block within each dummy mesh overlaps with a wire object. The dummy-metal-layout evaluating device 41 calculates dummy information after dummy metal blocks that are determined to be overlapped with the wire object are removed, integrates the dummy information with the wire-object information, and evaluates whether the circuit layout filled with dummy satisfies the design criteria.

As described above, the dummy-metal-layout evaluating device 41 disclosed in the present embodiment can evaluate a dummy metal layout staggered with respect to the direction in which a wire object extends. When it is compared with an approach using different tools for a dummy metal fill and for circuit layout evaluation, the time taken to set a proper dummy layout is decreased and the accuracy of calculating the density is improved. Even if a dummy pattern with one-sided offset or a dummy pattern with no offset is used, the dummy-metal-layout evaluating device can calculate a proper dummy layout.

[b] Second Embodiment

Figure 14:
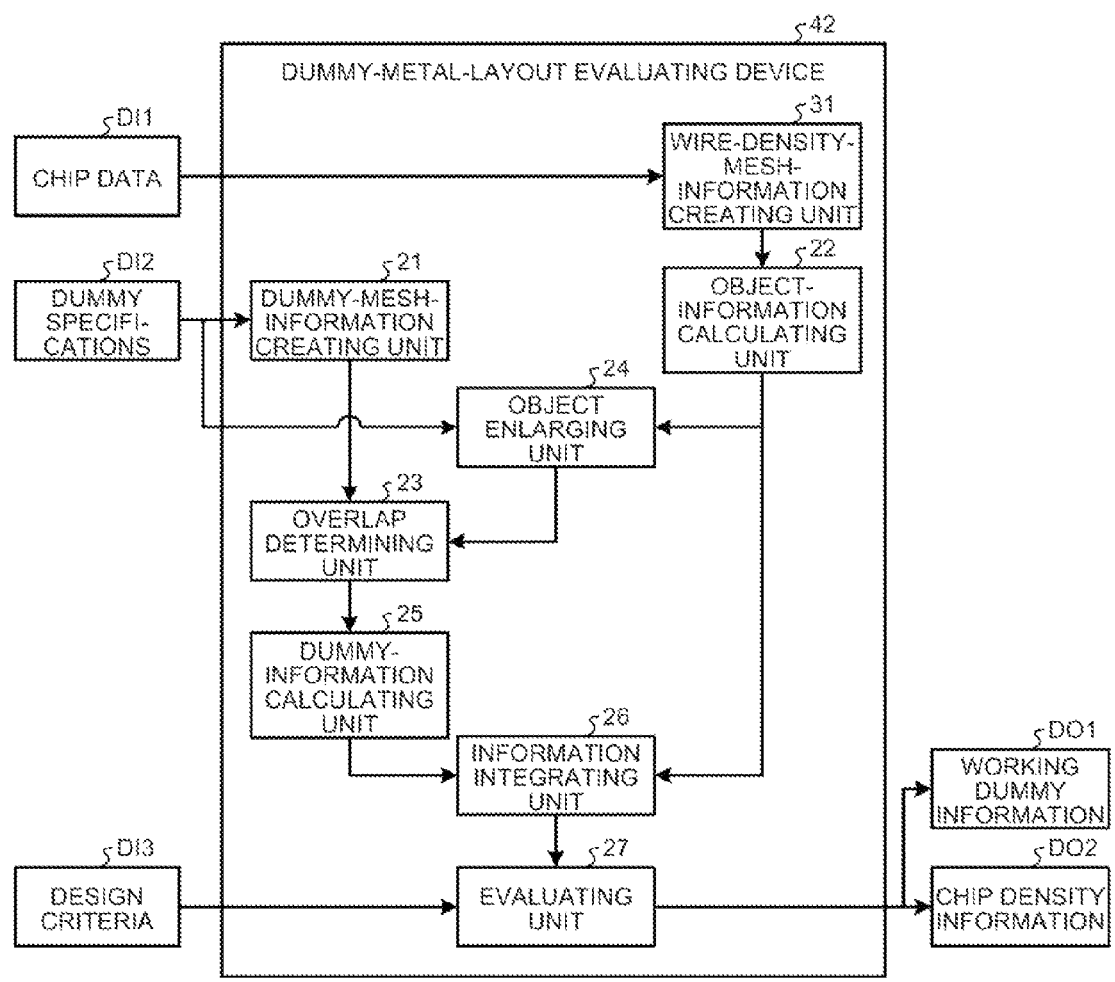
FIG. 14 is a block diagram of a dummy-metal-layout evaluating device according to the second embodiment.

FIG. 14 is a block diagram of a dummy-metal-layout evaluating device according to the second embodiment. As illustrated in FIG. 14, a dummy-metal-layout evaluating device 42 includes a wire-density-mesh-information creating unit 31 that generates wire density meshes using the chip data DI1, independently of dummy meshes. The second embodiment is different from the first embodiment in that the object-information calculating unit 22 calculates the wire density and the peripheral wire length of the wire density mesh. The other configuration and the other operation are the same as those of the first embodiment. Parts corresponding to those in the first embodiment are denoted with the same reference numerals, and the same description is not repeated.

Figure 15:
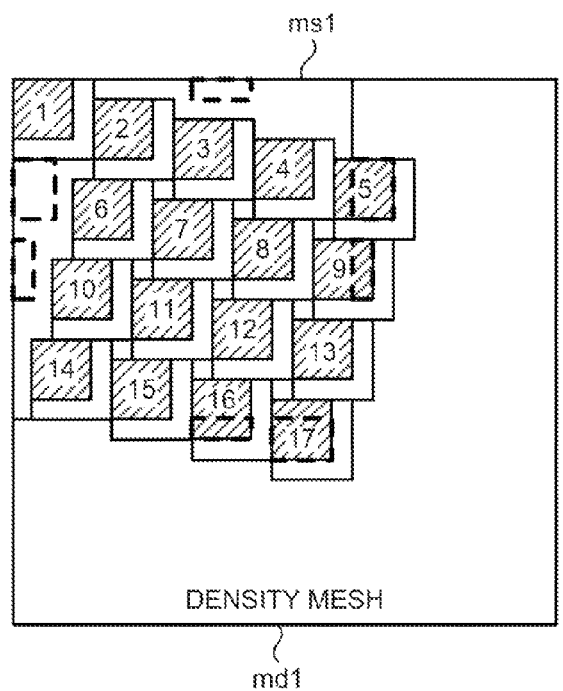
FIG. 15 is a schematic diagram of a wire density mesh and dummy meshes.

FIG. 15 is a schematic diagram of a wire density mesh and dummy meshes. As illustrated in FIG. 15, in the second embodiment, a wire density mesh (density mesh) md1 that is used to calculate the density of a fixed object, such as a wire, and the dummy mesh ms1 that is used to determine whether dummy metal is present are provided separately.

When it changes the dummy pattern to be filled, the size of dummy meshes changes; therefore, in the first embodiment, the density and the peripheral length of wire accounted for by the wire objects are recalculated after a dummy mesh change. In contrast, if the size of the wire density mesh (density mesh) is fixed, recalculation is not needed. Moreover, it is possible to calculate the wire density and the peripheral wire length in accordance with a size specified by a user.

Figure 16:
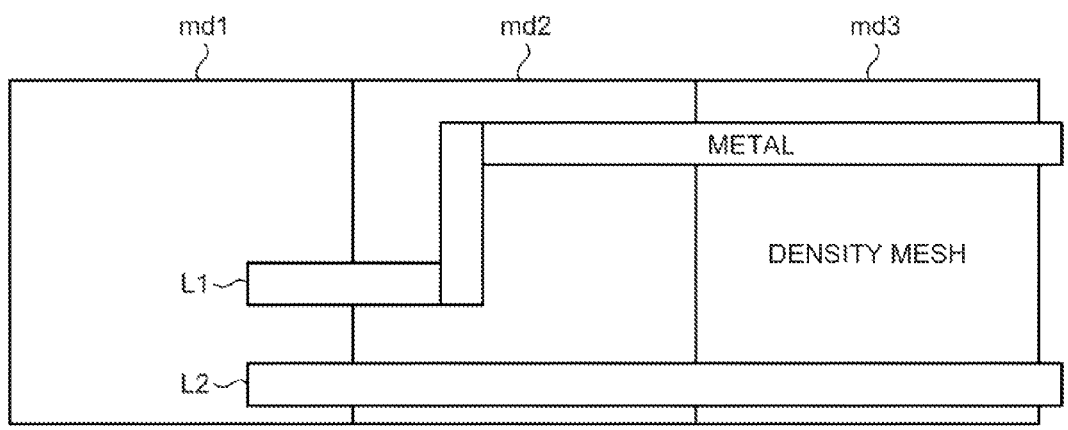
FIG. 16 is a schematic diagram of wire density meshes and wire objects.

In the second embodiment, when the density and the peripheral length of wire accounted for by the wire objects are calculated, the wire densities and the peripheral wire lengths of the wire objects L1 and L2 that are within each of wire density meshes (density meshes) md1 to md3 as illustrated in FIG. 16.

Figure 17:
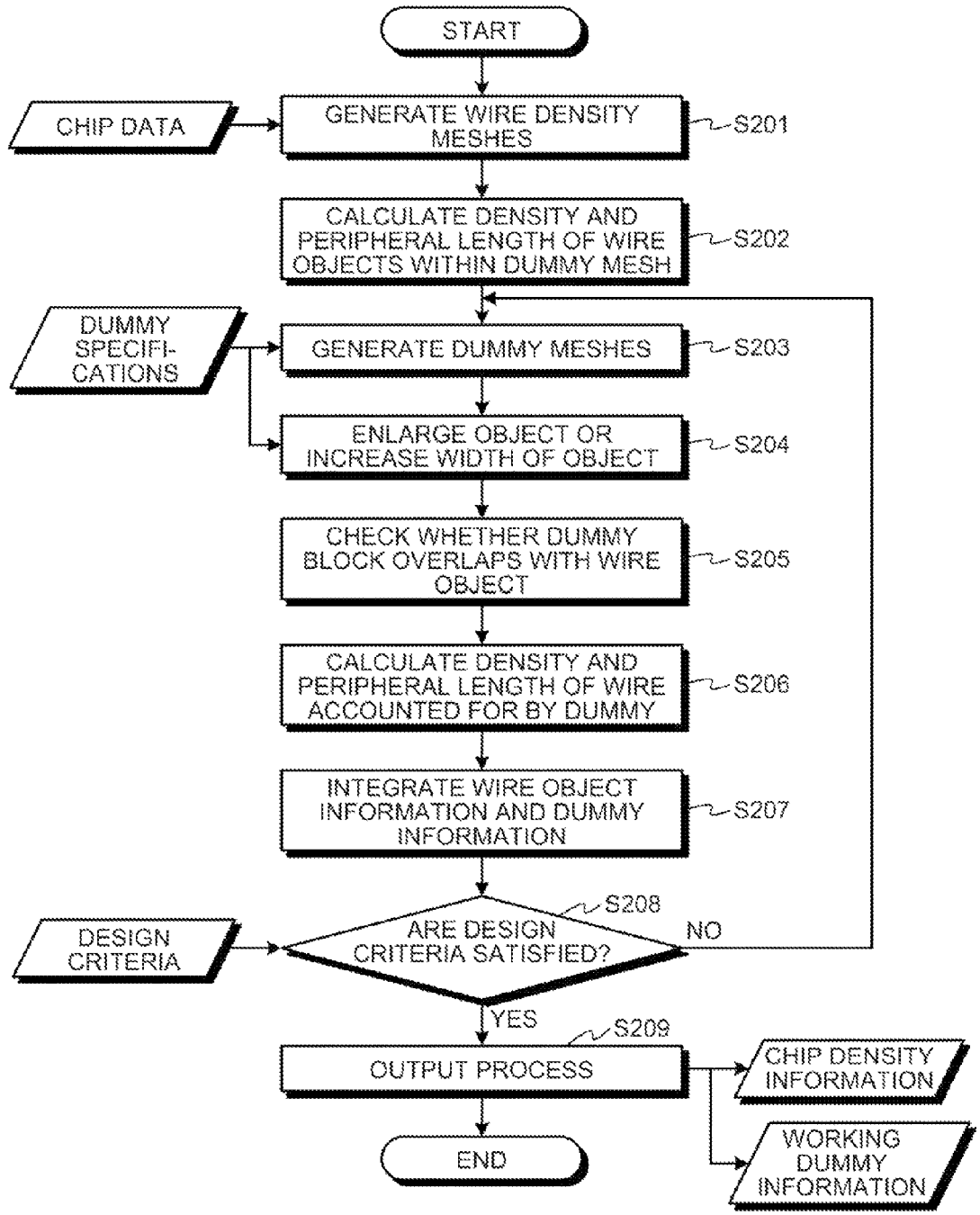
FIG. 17 is a flowchart of a process performed by the dummy-metal-layout evaluating device according to the second embodiment.

FIG. 17 is a flowchart of a process performed by the dummy-metal-layout evaluating device according to the second embodiment. When the process starts, the wire-density-mesh-information creating unit 31 generates wire density meshes using the chip data DI1 (S201). The object-information calculating unit 22 calculates the wire density and the peripheral wire length of the wire objects within each wire density mesh (S202).

The dummy-mesh-information creating unit 21 then generates dummy meshes based on the dummy specifications DI2 (S203). The object enlarging unit 24 enlarges the wire object or increases the width of the wire object based on the dummy rule and the spacing rule both specified by the dummy specifications DI2 (S204).

The overlap determining unit 23 checks whether a dummy block overlaps with the enlarged wire object (S205). The dummy-information calculating unit 25 calculates, using blocks that do not overlap with the enlarged wire object, the density and the peripheral length of wire accounted for by dummy (S206). The information integrating unit 26 integrates information about the wire object and information about the dummy (S207). The evaluating unit 27 evaluates whether the integrated information satisfies the design criteria DI3 (S208). If it does not satisfy the design criteria DI3 (S208, No), the process control returns to Step S203 and the dummy-metal-layout evaluating device 42 selects a different dummy rule and then generates dummy meshes.

If it satisfies the design criteria DI3 (S208, Yes), the evaluating unit 27 outputs the currently used dummy information as the working dummy information DO1 and the chip density information DO2 (S209), and thus the process control goes to end.

Figure 18:
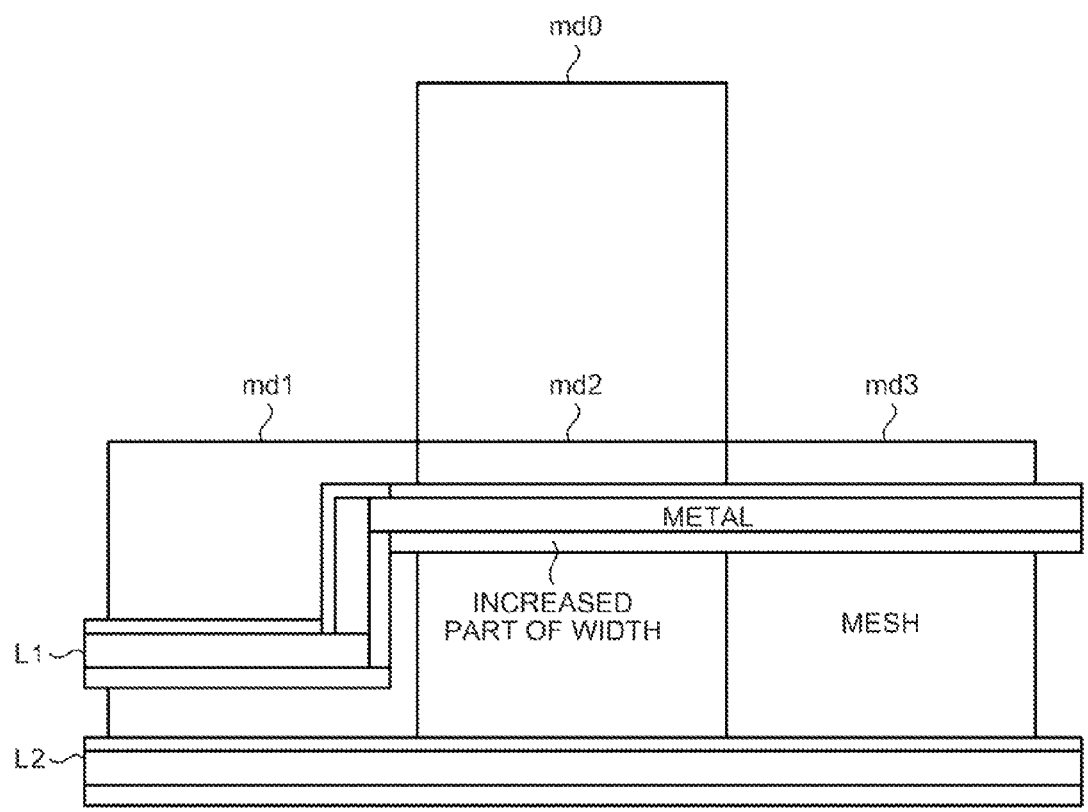
FIG. 18 is a first schematic diagram of an example of the operation of the dummy-metal-layout evaluating device 42.

The operation of the dummy-metal-layout evaluating device 42 is described below with examples. As illustrated in FIG. 18, the dummy-metal-layout evaluating device 42 overlaps the wire density meshes md0 to md3 with the wire objects L1 and L2 and then increases the width of the wire objects L1 and L2.

Figure 19:
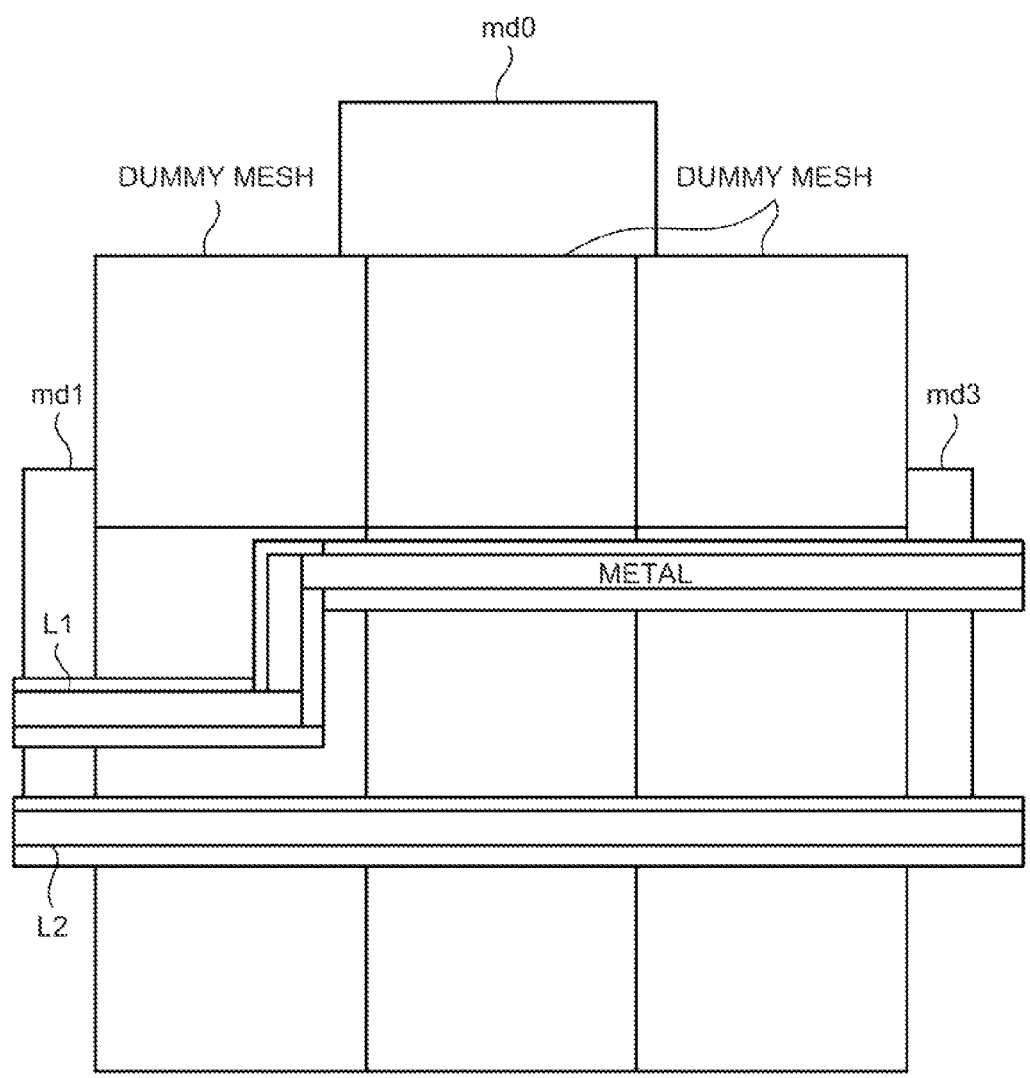
FIG. 19 is a second schematic diagram of an example of the operation of the dummy-metal-layout evaluating device 42.

The dummy-metal-layout evaluating device 42 overlaps, as illustrated in FIG. 19, the dummy meshes with the wire objects L1 and L2 and the wire density meshes md0 to md3.

Figure 20:
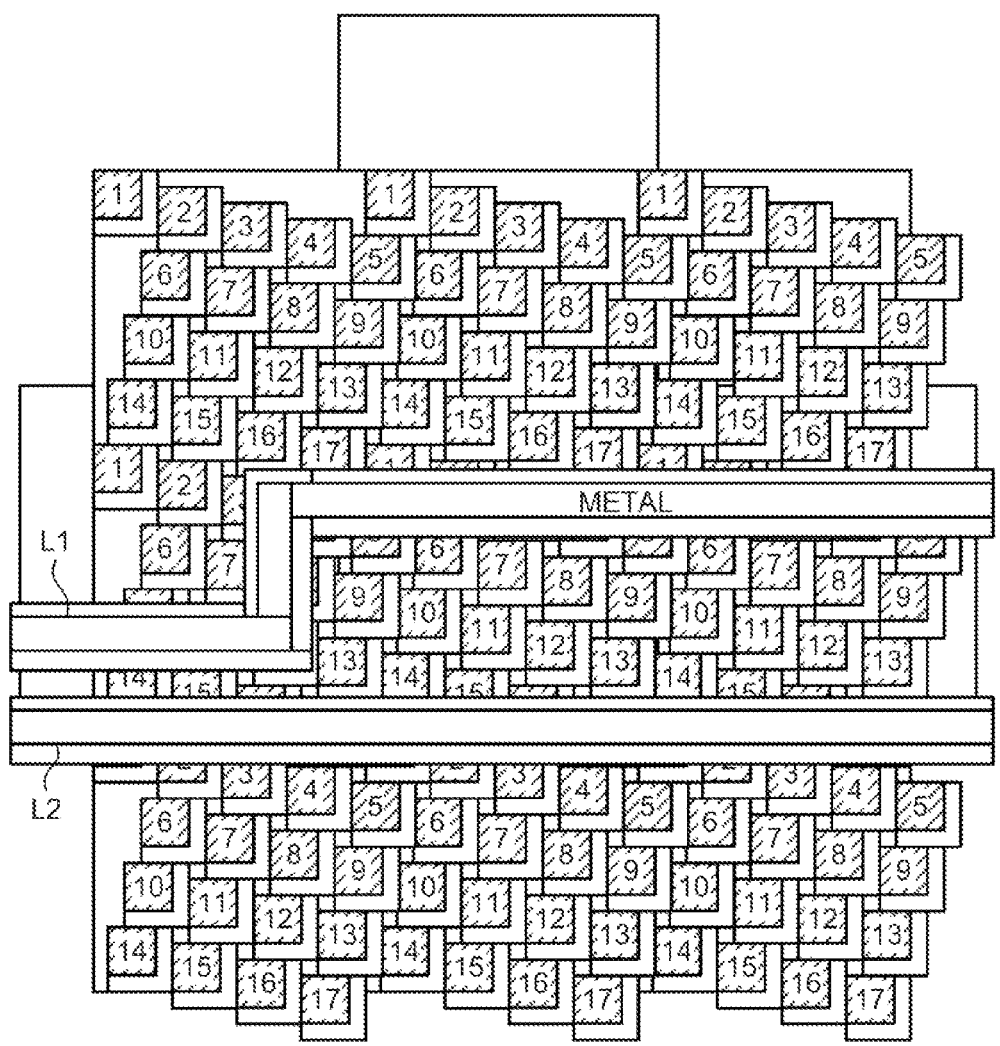
FIG. 20 is a third schematic diagram of an example of the operation of the dummy-metal-layout evaluating device 42.

As illustrated in FIG. 20, the dummy-metal-layout evaluating device 42 arranges blocks that do not overlap with the enlarged wire object on each dummy mesh. After that, as illustrated in FIG. 21, the dummy-metal-layout evaluating device 42 counts, using the positional relation between the dummy meshes and the wire density meshes, the number of dummy blocks within the wire density mesh.

Figure 21:
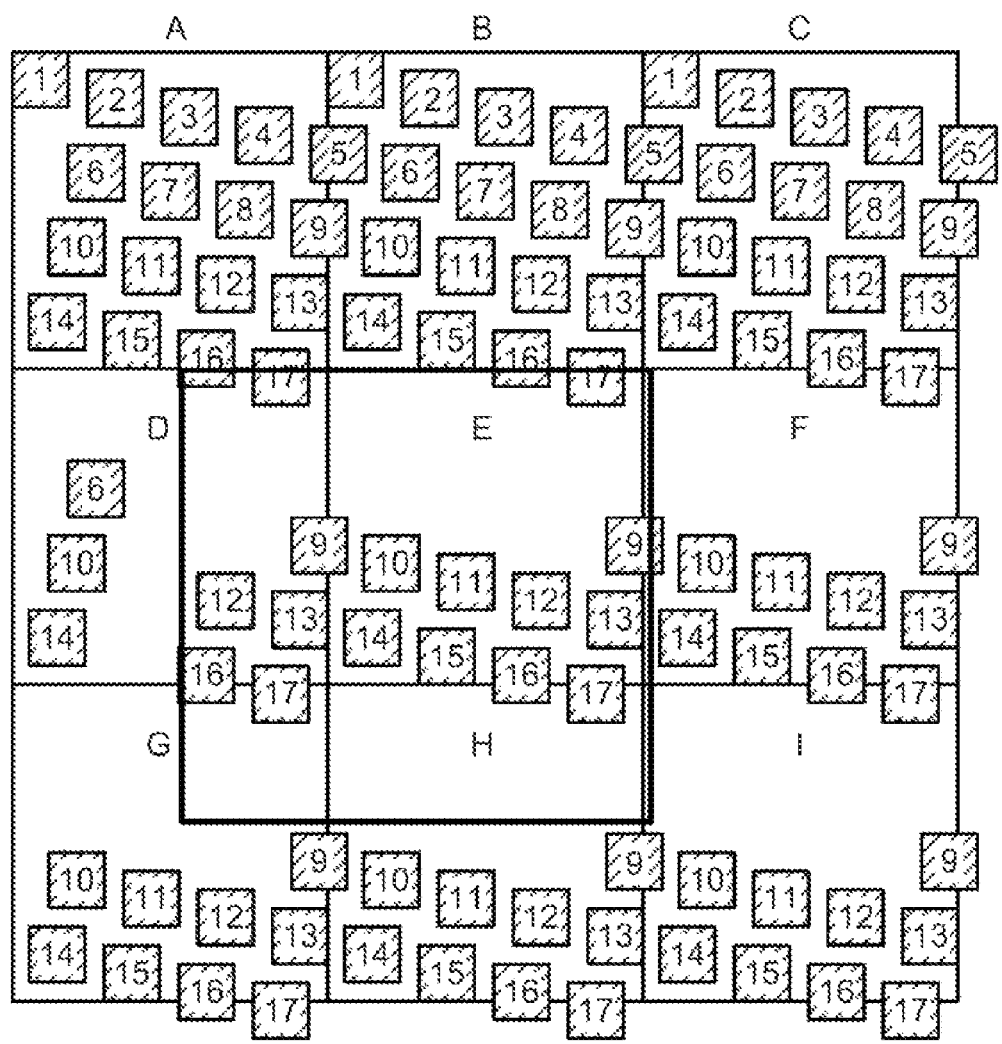
FIG. 21 is a fourth schematic diagram of an example of the operation of the dummy-metal-layout evaluating device 42.

In the example illustrated in FIG. 21, the target wire density mesh has parts overlapping with dummy meshes A to I. The blocks 16 and 17 of each of the dummy meshes A and B are partially valid, in other words, a part of each block is in the target wire density. The dummy mesh C has no valid block that is in the target wire density mesh.

The blocks 9, 12, 13, 16, and 17 of the dummy mesh D are valid blocks that are in the target wire density mesh. The blocks 10 to 17 of the dummy mesh E are valid blocks and the block 9 is a partially valid block. The block 14 of the dummy mesh F is a partially valid block. The dummy meshes G, H, and I has no valid block.

If x and y of the dummy block are 1.2 μm, the dummy spaces sx and sy are 0.3 μm, the offsets ox and oy are 0.375 μm, the size of the dummy mesh is 6.3×6.3, then the wire density of the total dummy blocks within the wire density mesh calculated to (1.2×1.2)×(13 blocks+2.0625 blocks (partially valid blocks))/(10×10)=21.69%

The peripheral wire length of the dummy blocks within the wire density mesh is calculated to (1.2×4)×13 blocks+4.7 blocks (partially valid blocks) =67.1

Therefore, information about the wire density mesh is as follows:

| Data [layer][global-mesh-x number][global-mesh-y number] x, y | |
|---|---|
| Dens (total copper percentage) | 31.69% |
| Dens1 (percentage of copper accounted for by wire objects) | 10% |
| Dens2 (percentage of copper accounted for by dummy blocks) | 21.69% |
| Edge length (peripheral length of total wire) | 107.1 μm |
| Edge length1 (peripheral length of wire accounted for by wire objects) | 40 μm |
| Edge length2 (peripheral length of wire accounted for by dummy blocks) | 67.1 μm |

Figure 22:
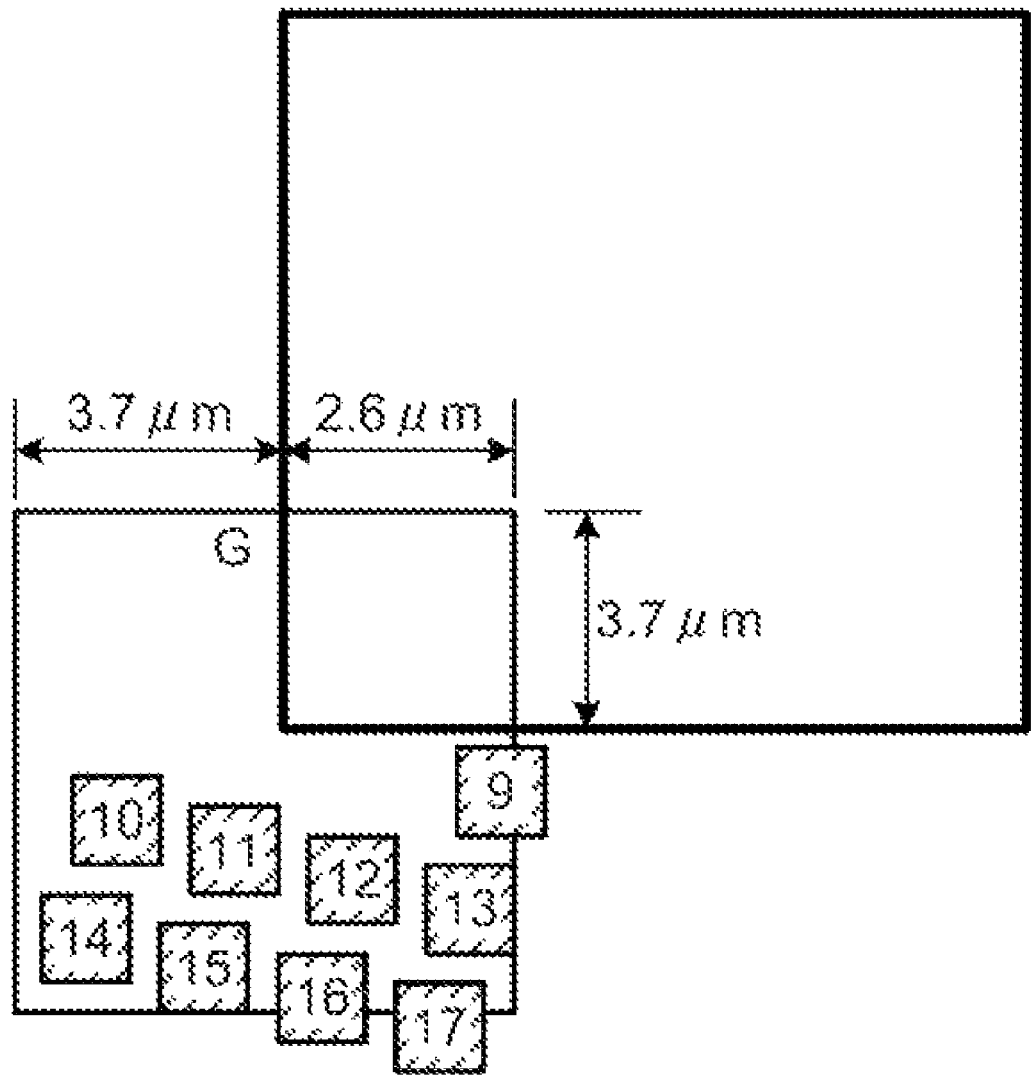
FIG. 22 is a schematic diagram that illustrates how a block is determined to be valid, partially valid, or invalid.

FIG. 22 is a schematic diagram that illustrates how a block is determined to be valid, partially valid, or invalid. When it is determined whether a block is valid in the wire density mesh, boundaries between wire density meshes are checked with respect to each dummy mesh. In the dummy mesh G, for example, has the area coordinates x>3.7 μm and y<3.7 μm. Using the coordinates of the dummy blocks within the dummy mesh, it is possible to identify valid dummy blocks that are within the area and partially valid dummy blocks that are on a boundary.

As described above, the dummy-metal-layout evaluating device 42 disclosed in the second embodiment can evaluate a dummy metal layout staggered with respect to the direction in which a wire object extends in the same manner as the dummy-metal-layout evaluating device used in the first embodiment. When it is compared with an approach using different tools for a dummy metal fill and for circuit layout evaluation, the time taken to set a proper dummy layout is decreased and the accuracy of calculating the density is improved.

Moreover, because the dummy-metal-layout evaluating device 42 disclosed in the second embodiment generates wire density meshes and dummy meshes, separately, even if it changes the currently used dummy pattern, it is unnecessary to recalculate the wire density and the peripheral wire length of the wire objects. This further decreases the time taken to calculate a proper dummy layout. Moreover, because the dummy-metal-layout evaluating device can create wire density meshes having arbitrary sizes, it can evaluate the wire density and the peripheral wire length in accordance with a size specified by a user.

[c] Third Embodiment

Figure 23:
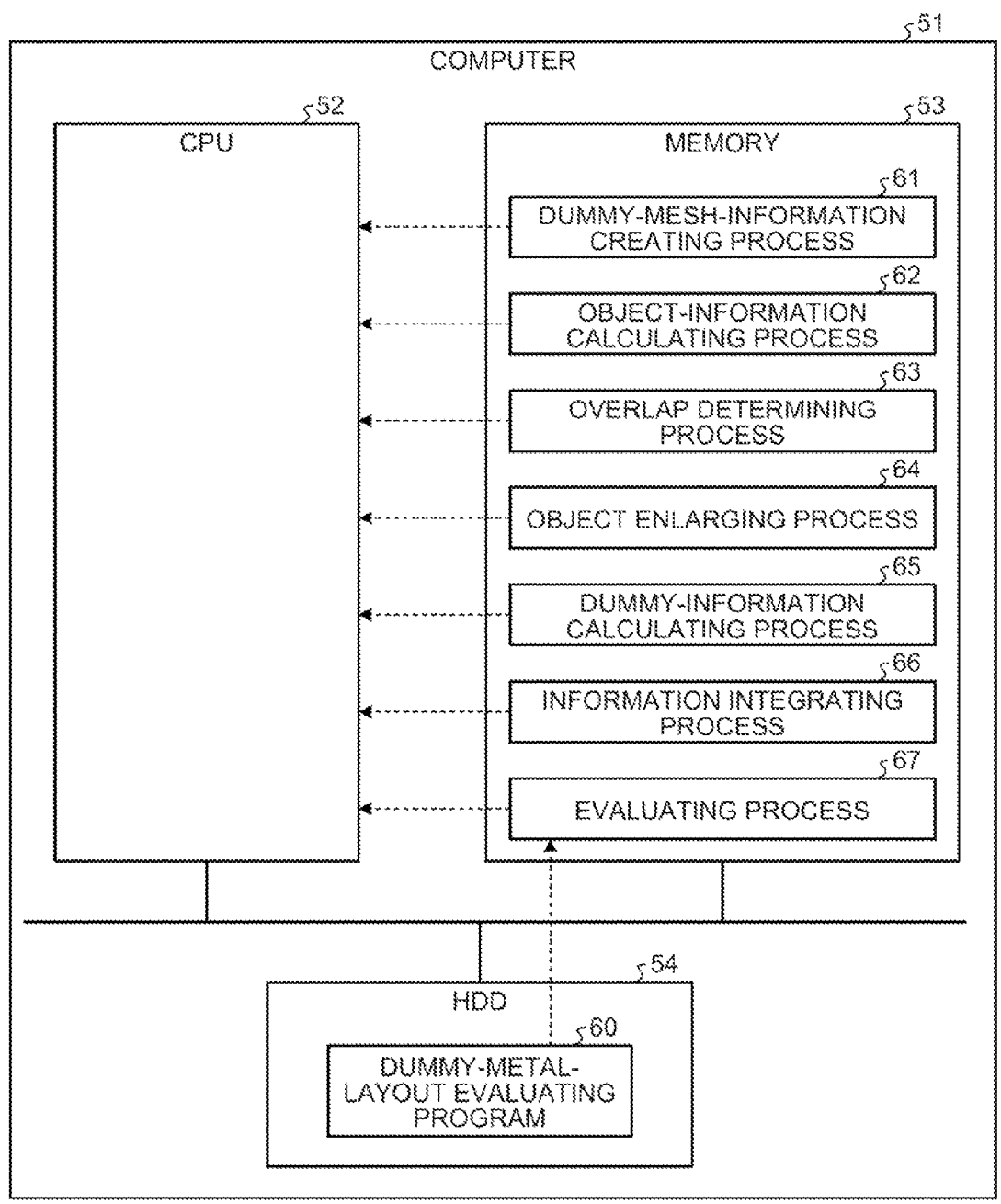
FIG. 23 is a block diagram that explains a dummy-metal-layout evaluating program according to the third embodiment.

FIG. 23 is a block diagram that explains a dummy-metal-layout evaluating program. As illustrated in FIG. 23, a computer 51 includes a central processing unit (CPU) 52, a memory 53, and a hard disk drive (HDD) 54.

The HDD 54 contains a dummy-metal-layout evaluating program 60 in a magnetic disk. When the computer 51 loads the dummy-metal-layout evaluating program 60 into the memory 53 and executes the dummy-metal-layout evaluating program 60, a dummy-mesh-information creating process 61, an object-information calculating process 62, an overlap determining process 63, an object enlarging process 64, a dummy-information calculating process 65, an information integrating process 66, and an evaluating process 67 are performed.

The dummy-mesh-information creating process 61 performs a process corresponding to the dummy-mesh-information creating unit 21 illustrated in FIG. 1. The object-information calculating process 62 performs a process corresponding to the object-information calculating unit 22 illustrated in FIG. 1. The overlap determining process 63 performs a process corresponding to the overlap determining unit 23 illustrated in FIG. 1. The object enlarging process 64 performs a process corresponding to the object enlarging unit 24 illustrated in FIG. 1. The dummy-information calculating process 65 performs a process corresponding to the dummy-information calculating unit 25 illustrated in FIG. 1. The information integrating process 66 performs a process corresponding to the information integrating unit 26 illustrated in FIG. 1. The evaluating process 67 performs a process corresponding to the evaluating unit 27 illustrated in FIG. 1.

As described above, the computer 51 can operate in the same manner as the dummy-metal-layout evaluating device 41 when it reads and executes the dummy-metal-layout evaluating program 60. The computer 51 can acquire data used during the above processes from an external device via an interface board. The computer 51 can send data containing an output of the above processes to an external device via an interface board. Although, in the example of FIG. 23, the programs are stored in the HDD, the programs can be stored in an arbitrary recording medium, such as a compact disc (CD).

According to an embodiment, it is possible to evaluate a dummy metal layout staggered with respect to the direction in which a wire object extends.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a dummy-metal-layout evaluating program causing a computer to execute a process, the process comprising:
    separating a group of dummy metal blocks that are arranged in a pattern regularly staggered with respect to a direction in which a wire object extends into meshes so that each mesh has the same layout of dummy metal blocks, thereby generating dummy meshes;
    determining whether a dummy metal block within the generated dummy mesh overlaps with the wire object;
    calculating dummy information that includes a wire density, which is the percentage area of a chip taken up by wiring, and a peripheral wire length, after any dummy metal block that is determined to be overlapped with the wire object is removed; and
    evaluating whether dummy-fill wire density and peripheral wire length are uniform, the dummy-fill wire density and peripheral wire length being generated by integrating the dummy information with information about the wire object.

2. The computer-readable, non-transitory medium according to claim 1, wherein the process further comprises separating the wire object into meshes, thereby generating wire meshes, wherein
    the determining includes determining, using a positional relation between the dummy meshes and the wire meshes, whether the dummy metal block overlaps with the wire object.

3. The computer-readable, non-transitory medium according to claim 1, wherein the process further comprises enlarging the wire object or increasing a width of the wire object in accordance with a rule that defines a space between the wire object and the dummy metal, wherein
    the determining includes determining whether the dummy metal block overlaps with the wire object enlarged by the enlarging.

4. A dummy-metal-layout evaluating method comprising:
    separating a group of dummy metal blocks that are arranged in a pattern regularly staggered with respect to a direction in which a wire object extends into meshes so that each mesh has the same layout of dummy metal blocks, thereby generating dummy meshes, using a processor;
    determining whether a dummy metal block within the generated dummy mesh overlaps with the wire object, using the processor;
    calculating dummy information that includes a wire density, which is the percentage area of a chip taken UP by wiring, and a peripheral wire length, after any dummy metal block that is determined to be overlapped with the wire object is removed, using the processor; and
    evaluating whether dummy-fill wire density and peripheral wire length are uniform, the dummy-fill wire density and peripheral wire length being generated by integrating the dummy information with information about the wire object, using the processor.

5. A dummy-metal-layout evaluating device comprising:
    a generation unit that separates a group of dummy metal blocks that are arranged in a pattern regularly staggered with respect to a direction in which a wire object extends into meshes so that each mesh has the same layout of dummy metal blocks, thereby generating dummy meshes;
    a determination unit that determines whether a dummy metal block within the generated dummy mesh overlaps with the wire object;
    a calculation unit that calculates dummy information that includes a wire density, which is the percentage area of a chip taken UP by wiring, and a peripheral wire length, after any dummy metal block that is determined to be overlapped with the wire object is removed; and
    an evaluation unit that evaluates whether dummy-fill wire density and peripheral wire length are uniform, the dummy-fill wire density and peripheral wire length being generated by integrating the dummy information with information about the wire object.

6. A dummy-metal-layout evaluating device comprising:
    a processor configured to execute a procedure, the procedure comprising:
    separating a group of dummy metal blocks that are arranged in a pattern regularly staggered with respect to a direction in which a wire object extends into meshes so that each mesh has the same layout of dummy metal blocks, thereby generating dummy meshes;

determining whether a dummy metal block within the generated dummy mesh overlaps with the wire object;

calculating dummy information that includes a wire density, which is the percentage area of a chip taken UP by wiring, and a peripheral wire length, after any dummy metal block that is determined to be overlapped with the wire object is removed; and evaluating whether dummy-fill wire density and peripheral wire length are uniform, the dummy-fill wire density and peripheral wire length being generated by integrating the dummy information with information about the wire object.

* * * * *